United States Patent [19]

Konno et al.

[11] E Re. 29,044

[45] Reissued Nov. 23, 1976

[54] METHOD FOR THE PREPARATION OF ACETYL CHLORIDE

[75] Inventors: Koji Konno, Iwaki; Katuhiro Kobayashi, Kita-ibaragi,, Japan

[73] Assignee: Kureha Kagaku Kogyo Kabushiki Kaisha, Tokyo, Japan

[22] Filed: Mar. 1, 1976

[21] Appl. No.: 662,447

Related U.S. Patent Documents

Reissue of:

[64] Patent No.: 3,894,921
Issued: July 15, 1975
Appl. No.: 389,311
Filed: Aug. 17, 1973

[30] Foreign Application Priority Data

Aug. 19, 1972 Japan ..... 47-83222

[52] U.S. Cl. ..... 204/163 R
[51] Int. Cl.[2] ..... B01J 1/10
[58] Field of Search ..... 204/163 R; 260/544 Y

[56] References Cited

OTHER PUBLICATIONS

Hazeldine et al., Chemical Society Journal (London), (1955) pp. 2151 to 2163.

*Primary Examiner*—Leland A. Sebastian

[57] ABSTRACT

This invention relates to a method for preparing acetyl chloride by reacting 1,1-dichloroethane with chlorine and oxygen under the irradiation of light.

6 Claims, No Drawings

METHOD FOR THE PREPARATION OF ACETYL CHLORIDE

Matter enclosed in heavy brackets [ ] appears in the original patent but forms no part of this reissue specification; matter printed in italics indicates the additions made by reissue.

DETAILED DESCRIPTION OF THE INVENTION

This invention relates to a method for the preparation of acetyl chloride, and more particularly to a method for preparing acetyl chloride by interacting 1,1-dichloroethane (hereinafter referred to simply as 1,1-DCE) and chlorine and oxygen under the irradiation of light.

In general, acid chlorides are very reactive and useful as an esterifying agent or an acylating agent. Among them, acetyl chloride is a compound which can be effectively used for introducing an acetyl group into other compounds.

Acetyl chloride has been usually prepared by a method wherein acetic acid is chlorinated by means of a particular chlorinating agent such as phosphorus pentachloride, phosphorus trichloride, thionyl chloride or phosgene. However, the method using such chlorinating agent has drawbacks in that the chlorinating agents are relatively expensive and special care is required in handling them, and that a large amount of by-products are formed as a result of the chlorination reaction. Accordingly, it is not necessarily advantageous to conduct a chlorination reaction by the use of such method, particularly when acetyl chloride is to be produced on an industrial scale.

It is therefore an object of the present invention to provide a method of the preparation of acetyl chloride by the use of inexpensive starting materials and an easy reaction process.

According to the present invention, there is provided a method for preparing acetyl chloride by photooxidizing 1,1-DCE in the presence of chlorine. In other words, the present invention is characterized by interacting 1,1-DCE and chlorine and oxygen under light-exposing conditions.

The present invention will be described in more detail.

1,1-DCE which is used as a starting material in the present invention can be easily prepared, for example, by adding hydrogen chloride to vinyl chloride, thus being readily available at a low cost. In accordance with the present invention, when 1,1-DCE is subjected to reaction with a mixture of chlorine and oxygen under the influence of light, chlorine molecules dissociate by the action of light to give chlorine radicals. The chlorine radicals function to expel a hydrogen at 1-position of 1,1-DCE thereby forming 1,1-dichloroethyl radicals. The light irradiation used in the reaction of the present invention is essentially required to activate chlorine molecules. A light source used for the light irradiation should generate light having a wavelength smaller than about 5000 A, preferably in the range of 2000 A – 4500 A.

Immediately after the formation of 1,1-dichloroethyl radicals, the addition reaction of chlorine molecules to the 1,1-dichloroethyl radicals and that of oxygen molecules to the 1,1-dichloroethyl radicals occur competitively. Accordingly, in order to increase the yield of acetyl chloride, it is necessary to increase the concentration of oxygen existing in the reaction system so that the reaction of the 1,1-dichloroethyl radicals occurs more easily with oxygen molecules occurs than with chlorine molecules. However, if the concentration of chlorine molecules in the reaction system is reduced to an extremely low level as compared with that of oxygen molecules, the formation of 1,1-dichloroethyl radicals will also decrease, with the result that a formation velocity of acetyl chloride which is obtained by the addition reaction between the radicals and oxygen molecules is remarkably lowered. In this sense, the ratio of oxygen gas and chlorine gas existing in the reaction system should be maintained within a certain range so as to produce acetyl chloride at a suitable reaction velocity with a high yield. Experiments revealed that the ratio of oxygen to chlorine is desired to be within a range of 5:1 – 1:5, preferably 3:1 – 1:3. With regard to reaction temperatures, it is desired to conduct the reaction at a temperature within a range of from room temperature to 200° C. preferably 20° – 100° C. since a remarkably high reaction temperature accelerates the decomposition of acetyl chloride formed.

As described hereinabove, acetyl chloride can be prepared, in the present invention, by interacting 1,1-DCE and oxygen and chlorine in a feeding ratio of 5:1 – 1:5, preferably 3:1 – 1:3, with irradiation of light having a wavelength of smaller than about 5000 A, preferably a wavelength of 2000 A – 4500 A, at a temperature of from room temperature to 200° C, preferably 20° – 100° C. Upon production of acetyl chloride under the above-mentioned conditions, there are also produced various by-products, including hydrogen chloride, 1,1,1-trichloroethane, 1,1,2-trichloroethane, monochloroacetylchloride, 1,1,2,2-tetrachloroethane, 1,1,2-tetrachloroethane, etc. Hydrogen chloride can be removed immediately from the reaction system since the same exists in the form of gas. On the other hand, the by-products remaining in the reaction system can be also separated from acetyl chloride when the acetyl chloride is collected by fraction distillation in an usual manner. Furthermore, the by-products may also be respectively collected by an usual fraction distillation. Among them, 1,1,1-trichloroethane is a useful compound in the sense that it can be suitably used as a solvent for various substances, or may be converted into acetyl chloride by hydrolysis as described in U.S. Pat. No. 1,870,601. The formation ratio of acetyl chloride and 1,1,1-trichloroethane can be freely varied with changes in the feeding ratio of chlorine and oxygen used in the reaction of the present invention. This will be particularly illustrated in Example 2 which will appear hereinafter.

In accordance with the present invention, the reaction may be conducted either in a gas phase or a liquid phase since the boiling point of 1,1-DCE serving as a starting material is 57.3° C while the reaction temperature used is within a range of from room temperature to 200° C. Where the reaction is conducted in a liquid phase, a solvent such as carbon tetrachloride may be used.

1,1-DCE which is used as a starting material is not necessarily required to be pure, but may contain therein some amount of other compounds, including 1,2-dichloroethane, unsaturated compounds such as vinyl chloride, dichloroethylene, trichloroethylene, tetrachloroethylene, etc., and/or chlorine compounds as secondarily produced by the method of the present invention.

Moreover, the formation of acetyl chloride is not obstructed even if the reaction system includes inactive gases, which take no part in the reaction of the present invention, including nitrogen, carbon dioxide, and/or hydrogen chloride, in coexistence with chlorine and oxygen.

As is apparent from the foregoing, the method of the present invention uses inexpensive and easily available 1,1-DCE as a starting material and acetyl chloride can be produced in a simple and easy manner, thus the present invention being capable of great contribution to chemical industries.

The following specific embodiments are included in order to more fully describe the present invention. These embodiments are for purposes of exemplification only and in no way are intended to limit the scope of the invention.

EXAMPLE 1

A transparent pyrex glass reaction container which had a diameter of about 7 cm and an inner volume of about 100 ml with a flat top and bottom and which was equipped with a reflux condenser and with a gas inlet and a sampling outlet, was placed in a thermostat the temperature of which was controlled at 50° C. Then, 70 g of 1,1-DCE was introduced into the container and chlorine gas and oxygen gas were further charged to the container each in an amount of 0.1 mol/g under irradiation of a 100 W high pressure mercury lamp (type SHL-100uV produced by Toshiba K.K.) while agitating by means of an agitator having teflon (Registered Trade Mark) coated blades.

The composition of the reaction solution was changed with the reaction time, as shown in Table 1.

Table 1

Changes in Composition of Reaction Solution with Elapses of Reaction Time

| Reaction time (min) | Composition of Reaction Solution (mol %) | | | | | | | |
|---|---|---|---|---|---|---|---|---|
| | $CH_3CHCl_2$ | $CH_3COCl$ | $CH_3CCl_3$ | $CH_2ClCHCl_2$ | $CH_2ClCOCl$ | $CH_2ClCCl_3$ | $CHCl_2CHCl_2$ | $CHCl_2COCl$ |
| 30 | 88.8 | 5.0 | 4.3 | 1.5 | 0.3 | — | — | — |
| 60 | 72.7 | 9.6 | 8.5 | 3.6 | 0.7 | — | — | — |
| 90 | 66.0 | 14.7 | 12.8 | 5.1 | 1.1 | 0.1 | — | 0.1 |
| 120 | 51.1 | 22.1 | 17.6 | 7.1 | 1.7 | 0.2 | — | 0.1 |
| 150 | 26.5 | 31.5 | 27.3 | 10.5 | 2.8 | 0.8 | 0.2 | 0.2 |
| 180 | 7.8 | 41.0 | 31.4 | 11.2 | 4.0 | 2.2 | 0.8 | 0.3 |
| 210 | 1.1 | 43.3 | 33.0 | 9.7 | 5.1 | 3.4 | 1.5 | 0.7 |
| 240 | 0.2 | 41.8 | 33.4 | 8.1 | 7.1 | 4.9 | 3.2 | 1.3 |

EXAMPLE 2

Example 1 was repeated except that chlorine gas and oxygen gas were charged in various different ratios and the reaction was conducted for 2 hours. The reaction is shown in Table 2 below.

Table 2

Influence by Varied Mixing Ratios of Chlorine and Oxygen

| Charged Amount | | Composition of Reaction Solution (mol %) | | | | | | | |
|---|---|---|---|---|---|---|---|---|---|
| $Cl_2$ | $O_2$ | $CH_3CHCl_2$ | $CH_3COCl$ | $CH_3CCl_3$ | $CH_2ClCHCl_2$ | $CH_2ClCOCl$ | $CH_2ClCCl_3$ | $CHCl_2CHCl_2$ | $CHCl_2COCl$ |
| 0.1 | 0.1 | 51.1 | 22.1 | 17.6 | 7.1 | 1.7 | 0.2 | — | 0.1 |
| 0.2 | 0.1 | 25.3 | 19.5 | 34.5 | 13.8 | 4.2 | 1.3 | 1.2 | 0.2 |
| 0.1 | 0.2 | 64.2 | 23.7 | 9.3 | 1.5 | 1.3 | — | — | — |
| 0.3 | 0.1 | 17.3 | 15.2 | 41.6 | 18.1 | 2.1 | 3.7 | 2.0 | — |
| 0.1 | 0.3 | 70.1 | 27.1 | 1.5 | — | 1.3 | — | — | — |

EXAMPLE 3

70 g of 1,1-DCE was mixed with chlorine gas, oxygen gas and nitrogen gas which were fed at 0.1 mol/h, 0.1 mol/h and 0.2 mol/h, respectively, for reaction in the same manner as in Example 1. A composition of the reaction solution obtained after a lapse of 2 hours is as follows:

| | |
|---|---|
| $CH_3CHCl_2$ | 63.6 mol % |
| $CH_3COCl$ | 16.5 |
| $CH_3CCl_3$ | 13.1 |
| $CH_2ClCHCl_2$ | 5.2 |
| $CH_2ClCOCl$ | 1.4 |
| $CH_2ClCCl_3$ | 0.1 |
| $CHCl_2CHCl_2$ | 0.1 |
| $CHCl_2COCl$ | — |

EXAMPLE 4

Example 1 was repeated except that a mixture of 35 g of 1,1-DCE and 35 g of 1,2-DCE was used and the reaction time was 2 hours. The resultant reaction solution contained the following components.

| | |
|---|---|
| $CH_3CHCl_2$ | 23.7 mol % |
| $CH_2ClCH_2Cl$ | 40.7 |
| $CH_3COCl$ | 12.1 |
| $CH_3CCl_3$ | 9.6 |
| $CH_2ClCHCl_2$ | 12.4 |
| $CH_2ClCOCl$ | 3.4 |
| $CH_2ClCCl_3$ | 0.1 |
| $CHCl_2CHCl_2$ | — |
| $CHCl_2COCl$ | 0.1 |

EXAMPLE 5

Example 1 was repeated except that a mixture of 35 g of 1,1-DCE and 35 g of cis-1,2-dichloroethylene was used with a reaction time of 2 hours. The resultant reaction solution contained the following components.

| | |
|---|---|
| $CH_3CHCl_2$ | 27.0 mol % |
| cis—CHCl=CHCl | 33.6 |

-continued

| | |
|---|---|
| $CH_3COCl$ | 12.3 |
| $CH_3CCl_3$ | 6.8 |
| $CH_2ClCHCl_2$ | 4.2 |
| $CH_2ClCOCl$ | 1.7 |
| $CH_2ClCCl_3$ | 0.1 |
| $CHCl_2CHCl_2$ | 13.3 |
| $CHCl_2COCl$ | 0.8 |
| $CHCl_2CHO$ | 0.2 |

EXAMPLE 6

A usual gas phase flow type photo-reactor was used as a reaction container and a lamp (type SHL – 100 UV) of an ultra-violet ray was used as a light source. While, 1,1-DCE was gasified with use of an evaporator. The gasified 1,1-DCE was mixed with chlorine gas and oxygen gas in such a manner that a mixing ratio of 1,1-DCE: $Cl_2$ : $O_2$ was 1:1:1 (by mole). The mixture gas was fed to the gas phase reactor of 90° C at such a flow rate that the residual time of the flowing gas was about 100 sec. The resultant gas discharged from the reactor was cooled and subjected to a test for determining components which were contained in the final gas. The test results are as follows.

| | |
|---|---|
| $CH_3CHCl_2$ | 47.3 mol % |

-continued

| | |
|---|---|
| $CH_3COCl$ | 28.3 |
| $CH_3CCl_3$ | 12.3 |
| $CH_2ClCHCl_2$ | 6.8 |
| $CH_2ClCOCl$ | 3.6 |
| $CH_2ClCCl_3$ | 0.3 |
| $CHCl_2CHCl_2$ | 0.4 |
| $CHCl_2COCl$ | 0.8 |
| $CHCl_2CCl_3$ | 0.2 |

What is claimed is:

1. A method for the preparation of acetyl chloride characterized by interacting 1,1-dichloroethane and chlorine gas and oxygen gas under light irradiated conditions.

2. A method according to claim 1, wherein oxygen gas and chlorine gas are fed in a ratio within a range of 5:1 – 1:5.

3. A method according to claim 1, wherein the reaction is conducted with the use of light having a wavelength smaller than 5000 A.

4. A method according to claim 3, wherein said wavelength is within a range of 2000 – 4500 A.

5. A method according to claim 1, wherein the reaction is conducted at a temperature of from room temperature to 200° C.

6. A method according to claim 5, wherein said temperature is within a range of 20° – 100° C.

* * * * *